United States Patent [19]

Wilson

[11] Patent Number: 5,125,286
[45] Date of Patent: Jun. 30, 1992

[54] HANDLEBAR HANDGRIP

[76] Inventor: Ken Wilson, 9926 Prospect Ave., Santee, Calif. 92071

[21] Appl. No.: 657,075

[22] Filed: Feb. 19, 1991

[51] Int. Cl.⁵ .............................................. B62K 21/26
[52] U.S. Cl. ..................................... 74/551.9; 74/558; 273/73 J; 273/81 R
[58] Field of Search .................... 74/558, 558.5, 551, 74/551.4, 551.9; 273/81 D, 81 R, 73 J

[56] References Cited

U.S. PATENT DOCUMENTS

| | | | |
|---|---|---|---|
| 586,830 | 7/1897 | Williams | 74/551.9 X |
| 3,205,729 | 9/1965 | Golden | 74/551.9 X |
| 3,848,480 | 11/1974 | Oseroff et al. | 74/551.9 X |
| 4,098,506 | 7/1978 | Gaiser | 74/558 X |
| 4,158,407 | 6/1979 | Rest | 74/558.5 X |
| 4,416,166 | 11/1983 | Jannard et al. | 74/551.9 |
| 4,535,649 | 8/1985 | Stahel | 74/551.9 |
| 4,611,671 | 9/1986 | Hansson | 74/551.9 X |
| 4,630,502 | 12/1986 | Greco | 74/551.1 |
| 4,815,738 | 3/1989 | DiFranco | 273/73 J |
| 4,852,423 | 8/1989 | Mikami et al. | 74/558 X |
| 4,907,810 | 3/1990 | Whiteford | 273/81 R X |
| 4,941,232 | 7/1990 | Decker et al. | 74/551.9 X |

Primary Examiner—Leslie A. Braun
Assistant Examiner—Winnie Yip
Attorney, Agent, or Firm—Charles C. Logan, II

[57] ABSTRACT

A handgrip that may be installed on the handlebar of a jet-ski, a motorcycle, or bicycle. The grip has three major components which are the major tubular handgrip member, a tubular sleeve, and an end cap. The major tubular handgrip member has the tubular sleeve member slid on over its outer surface and until it abutts an annular ridge. The end cap is then inserted over the tubular neck portion until it abutts the tubular sleeve. An adhesive on the tubular neck portion holds the end cap in position. The tubular sleeve is made of open cell foam material which is gripped by the palm of the rider's hand. The tubular sleeve functions to prevent blisters to the rider's hand.

4 Claims, 1 Drawing Sheet

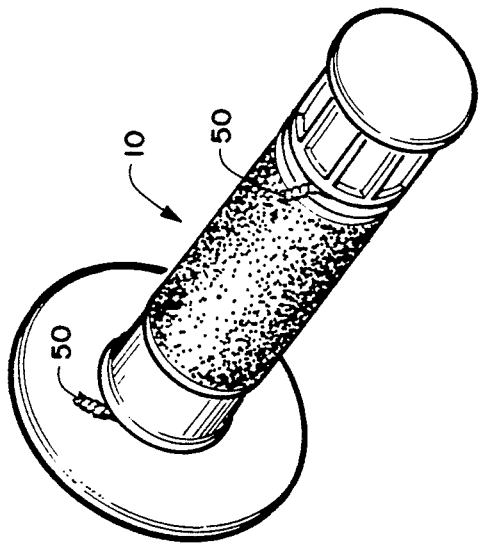
FIGURE 1
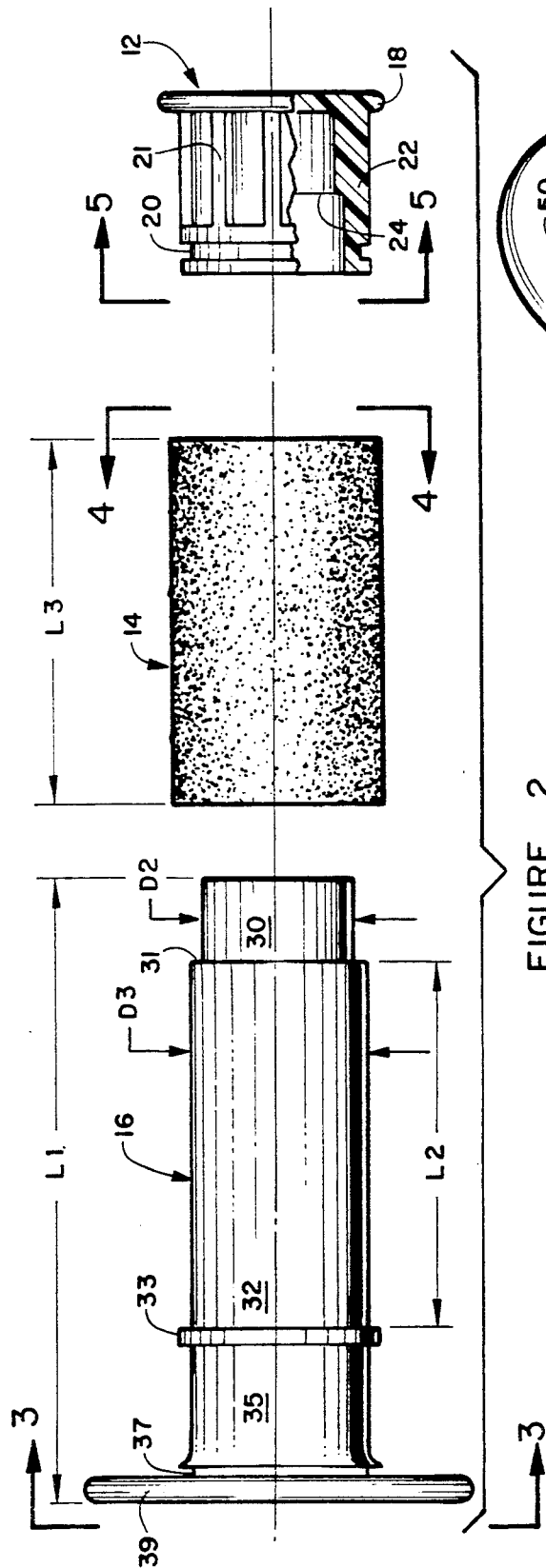
FIGURE 2
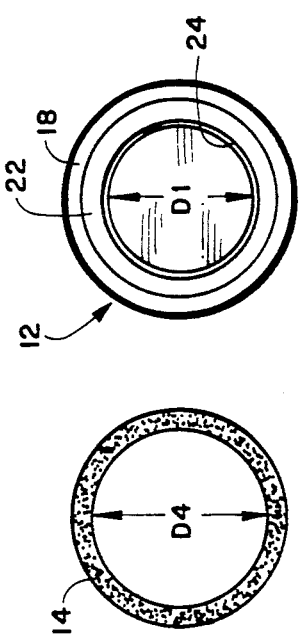
FIGURE 5
FIGURE 4
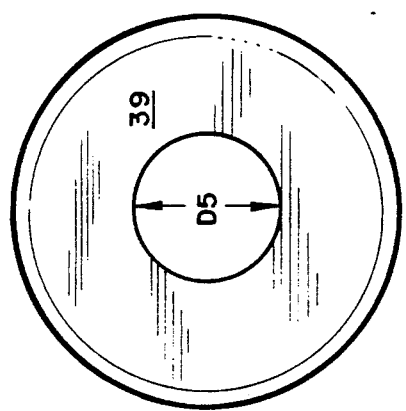
FIGURE 3

HANDLEBAR HANDGRIP

BACKGROUND OF THE INVENTION

The invention relates to handlebars and more specifically to a unique handgrip that can be used on the handlebars of jet-skis, motorcycles, and bicycles.

Presently most handgrips on the market are formed as a unitary solid member. Many of these are made of the thermoplastic rubber polymer material such as Kraton. Other models are made of real rubber and cheaper models are merely made of plastic material.

One of the most annoying features of existing handgrips is that the rider of the vehicle develops blisters on the palms of their hands for gripping the handgrip.

Another problem that exists is the fact that handgrips on many vehicles tend to slip or spin in the rider's hand. Although the handgrips are often installed with an adhesive coating on the handlebar, water, dust and dirt that get into the interior of the handgrip loosen them and cause them to turn. Sometimes the heat from the palm of the rider's hands get the grip warm enough so that it will cause the adhesive to release and allow the grip to spin. One method of overcoming this problem is to have a pair of laterally spaced annular grooves in the handgrip and the rider winds safety wire around these grooves and twists them with pliers to tighten them firmly against the handlebars.

It is an object of the invention to provide a novel handlebar handgrip having unique structure which prevents the occurance of blisters on the palms of the hands of a rider.

It is also an object of the invention to provide a novel handlebar handgrip made of three individual members that are assembled together.

It is another object of the invention to provide a novel handlebar handgrip that is economical to manufacture and market.

It is a further object of the invention to provide a novel handlebar handgrip that is easily installed on the handlebar of a jet-ski, a bicycle, or motorcycle.

SUMMARY OF THE INVENTION

The inventor's novel handlebar handgrip has been designed to prevent blisters from forming in the palms of the hands of a rider of jet-skis, bicycles, and motorcycles. It is formed of three individual components and they are the end cap, the tubular sleeve, and a major tubular handgrip member.

The major tubular handgrip member is preferably made of a thermoplastic rubber polymer material such as Kraton. From its outer end in sequence it has a tubular neck portion, a tubular intermediate portion, a tubular base portion, and disc-shaped end portion. An annular groove is formed on the outer surface of the major tubular handgrip member between the disc-shaped end portion and the tubular base portion. This annular groove is designed to receive a length of safety wire that is wrapped around it and tighted by the rider of the vehicle. An annular ridge is formed on the outer surface of the major tubular handgrip member between the tubular base portion and the tubular intermediate portion and it functions to restrict the travel of the tubular sleeve when it inserted thereon.

The tubular sleeve member is preferably made of an open cell foam material such as neoprene. It has an inner diameter substantially the same as the outer diameter of the tubular intermediate portion of the major tubular handgrip member so that they frictionally engage each other. The length of the tubular sleeve member is approximately in the length of 2" to 2 and ½". It is its cushioning feature that prevents blisters from forming in the palm of the rider's hands.

The end cap is also preferably made of a thermoplastic rubber material such as Kraton. The tubular neck portion of the major tubular handgrip member has an adhesive applied to its outer surface and the end cap is then slid over it after the tubular sleeve has been slid onto the tubular intermediate portion. An annular groove is formed on the outside surface of the end cap adjacent its forward end for receiving a safety wire that is wound around it and tightened.

DESCRIPTION OF THE FIGURES OF THE DRAWING

FIG. 1 is a front perspective view illustrating the novel handlebar handgrip in its assembled state;

FIG. 2 is an exploded side elevational view of the novel handlebar handgrip;

FIG. 3 is an end elevational view taken along lines 3—3 of FIG. 2;

FIG. 4 is an end elevational view taken along lines 4—4 of FIG. 2; and

FIG. 5 is an end elevational view taken along lines 5—5 of FIG. 2.

DESCRIPTION OF THE PREFERRED EMBODIMENT

The novel handlebar handgrip will now be described by referring to FIGS. 1-5 of the drawing. The handlebar handgrip is generally designated numeral 10. It is formed of three major components, end cap 12, tubular sleeve 14, and major tubular handgrip member 16.

End cap 12 has an annular flange 18 formed on its one end and an annular groove 20 formed adjacent its other end. The inner end of the end cap has a bore having a diameter D1 that extends into tubular portion 22 until it abutts a shoulder 24. Tubular portion 22 has a plurality of longitudinally extending reinforcing ribs 21 around its outer surface.

Major tubular handgrip member 16 has a tubular neck portion 30 whose outer diameter D2 is substantially the same as diameter D1 of the end cap 12. A shoulder 31 forms the start of the structure of the tubular intermediate portion 32 and it has an annular ridge 33 formed at its opposite end. The outer diameter of tubular intermediate portion 32 is D3 and that is substantially the same as the inner diameter D4 of tubular sleeve 14. Tubular base portion 35 abutts annular ridge 33 and it has an annular groove 37 formed at its other end. A disc-shaped end portion 39 forms the inner end of the major tubular handgrip member 16 whose overall length is L1. The length of tubular intermediate portion 32 is L2 and it approximates the length L3 of tubular sleeve 14. Major tubular handgrip member 16 has an inner diameter D5 that extends throughout its length.

The safety wires 50 are illustrated installed on the handlebar handgrip in FIG. 1.

What is claimed is:

1. A handlebar handgrip assembly comprising:
an elongated major tubular handgrip member having a predetermined length L1, said major tubular handgrip member having an inner end and an outer end; from said inner end to said outer end in sequence said major tubular handgrip member having a tubular neck portion having an outer diameter D2, a tubular intermediate portion having an outer diameter D3, and a tubular base portion;

said major tubular handgrip member being made of thermoplastic rubber polymer material, said major tubular handgrip member having a disc-shaped end portion formed on its outer end whose outer diameter is larger than said tubular base portion and is great enough to prevent a persons hand from sliding pas said disc-shaped end portion, an annular groove on said major tubular handgrip member between said disc-shaped end portion and said tubular base portion a safety wire being tightened therearound said annular groove for clamping said major tubular handgrip member on a handlebar;

said major tubular handgrip member having a constant inner diameter D5 that extends completely through its length from its inner end to its outer end, the outer diameter D2 of said tubular neck portion being smaller than the outer diameter D3 of said tubular intermediate portion, said tubular intermediate portion having a length L2;

a tubular sleeve having a predetermined length L3 that is substantially equal to said length L2 of the tubular intermediate portion, said tubular sleeve is detachably received over the tubular intermediate portion of said major tubular handgrip member, said tubular sleeve being made of open cell foam material; and an end cap that is removably received on the tubular neck portion of said major tubular handgrip member.

2. A handlebar handgrip as recited in claim 1 further comprising an annular ridge on said major tubular handgrip member that limits the travel of said tubular sleeve when it is slid onto said major tubular handgrip member.

3. A handlebar handgrip as recited in claim 1 wherein said end cap has a first end and a second end, an annular groove is formed in said end cap adjacent its first end.

4. A handlebar handgrip as recite din claim 3 wherein said end cap has a plurality of longitudinally extending reinforcing ribs on its outer surface.

* * * * *